(12) United States Patent
Rutledge et al.

(10) Patent No.: US 9,354,942 B2
(45) Date of Patent: May 31, 2016

(54) COORDINATING POWER STATES IN A HYBRID INFORMATION HANDLING DEVICE

(75) Inventors: James S. Rutledge, Durham, NC (US); Aaron M. Stewart, Raleigh, NC (US); Steven R. Perrin, Raleigh, NC (US); Scott E. Kelso, Cary, NC (US); Seiichi Kawano, Kanagawa (JP); Mitsuhiro Yamazaki, Kanagawa-ken (JP); Karen R. Kluttz, Raleigh, NC (US); Matthew P. Roper, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 133 days.

(21) Appl. No.: 13/343,814

(22) Filed: Jan. 5, 2012

(65) Prior Publication Data

US 2013/0179903 A1 Jul. 11, 2013

(51) Int. Cl.
*G06F 9/50* (2006.01)
*G06F 1/32* (2006.01)

(52) U.S. Cl.
CPC ............ *G06F 9/5094* (2013.01); *G06F 1/3287* (2013.01); *Y02B 60/1282* (2013.01); *Y02B 60/142* (2013.01)

(58) Field of Classification Search
CPC ... G06F 1/3203; G06F 1/3296; G06F 1/3287; G06F 1/26; G06F 1/3206; G06F 1/324; G06F 1/3275; G06F 1/329; G06F 12/00; G06F 1/32; G06F 1/3243; G06F 11/0757; G06F 1/325; G06F 9/30083; G06F 9/4418
See application file for complete search history.

(56) References Cited

U.S. PATENT DOCUMENTS

| | | | |
|---|---|---|---|
| 2008/0146178 A1* | 6/2008 | Lu et al. | 455/187.1 |
| 2009/0063845 A1* | 3/2009 | Lin | 713/100 |
| 2010/0023788 A1* | 1/2010 | Scott | G06F 1/3209 713/320 |
| 2010/0218014 A1* | 8/2010 | Bozek | G06F 1/3209 713/320 |
| 2012/0137006 A1* | 5/2012 | Minato et al. | 709/226 |
| 2012/0191961 A1* | 7/2012 | Wu et al. | 713/2 |
| 2013/0072260 A1* | 3/2013 | Nair et al. | 455/566 |

* cited by examiner

*Primary Examiner* — Tuan Dao
(74) *Attorney, Agent, or Firm* — Ference & Associates LLC

(57) ABSTRACT

Systems, methods and products directed toward coordinating power states in a hybrid information handling device are described herein. One aspect includes a method including: providing a primary operating environment and a secondary operating environment in an information handling device; ascertaining a trigger event for switching between the primary operating environment and the secondary operating environment; providing power state transitioning responsive to the trigger event; and placing one of the primary operating environment and the secondary operating environment in a working state while one of the primary operating environment and the secondary operating environment is in a sleeping state. Other embodiments are described herein.

20 Claims, 5 Drawing Sheets

COORDINATING POWER STATES IN A HYBRID INFORMATION HANDLING DEVICE

BACKGROUND

Information handling devices come in a variety of forms including for example laptop computers, slate/tablet computers, smart phones, and the like. Tablet computers and laptop computers are different on many levels. Tablet or slate computers are generally smaller and more lightweight than laptop computers, often consisting only of a single component. Tablet computers integrate the display with the typical lower base portion of a laptop/clamshell computer, usually lack a physical keyboard, and often utilize a touch screen as an input device.

In addition to structural differences, tablet and laptop computers also differ with respect to their internal software and hardware configurations. The typical laptop computer form factor houses a Win-Tel platform, comprised of an Intel x86 compatible processor and is capable of running a Microsoft WINDOWS operating system, such as WINDOWS 7 operating system. In comparison, tablet computers include a light weight platform and are most likely to run on lower powered processors and lighter weight operating systems specially designed for smaller devices. The lighter weight operating systems are often referred to as mobile operating systems, and are optimized for touch and content consumption instead of running large applications, such as the full version of the Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 is a registered trademark of Microsoft Corporation in the United States and/or other countries. ANDROID is a registered trademark of Google Incorporated in the United States and/or other countries. SNAPDRAGON BY QUALCOMM is a registered trademark of Qualcomm Incorporated in the United States and/or other countries.

BRIEF SUMMARY

In summary, one aspect provides an information handling device comprising: one or more processors; one or more memories storing program instructions accessible by the one or more processors; and wherein, responsive to execution of program instructions stored in said one or more memories, the one or more processors are configured to: provide a primary operating environment and a secondary operating environment; ascertain a trigger event for switching between said primary operating environment and said secondary operating environment; provide power state transitioning responsive to said trigger event; and place one of said primary operating environment and said secondary operating environment in a working state while one of said primary operating environment and said secondary operating environment is in a sleeping state.

Another aspect provides a method comprising: providing a primary operating environment and a secondary operating environment in an information handling device; ascertaining a trigger event for switching between said primary operating environment and said secondary operating environment; providing power state transitioning responsive to said trigger event; and placing one of said primary operating environment and said secondary operating environment in a working state while one of said primary operating environment and said secondary operating environment is in a sleeping state.

A further aspect provides a computer program product comprising: a storage device having computer readable program code embodied therewith, the computer readable program code comprising: program code configured to provide a primary operating environment and a secondary operating environment in an information handling device; program code configured to ascertain a trigger event for switching between said primary operating environment and said secondary operating environment; program code configured to provide power state transitioning responsive to said trigger event; and program code configured to place one of said primary operating environment and said secondary operating environment in a working state while one of said primary operating environment and said secondary operating environment is in a sleeping state.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Tablet and laptop computers each have their own set of advantages. Advantages for tablet computers include mobility, size, weight, and increased ease of use for certain functions, such as image manipulation. While primary reasons for preferring laptop computers are increased processing power and battery life, wider choice of operating systems and applications, and the presence of the standard/physical keyboard and touch input devices. As such, it would be advantageous to provide a form factor that includes the functionality and features of both a laptop computer and a tablet computer in one single information handling device.

Embodiments provide for a hybrid information handling device comprising a primary environment (PE) (for example, a Win-Tel platform) and a secondary environment (SE) (for example, a light weight/ANDROID platform) in a single unit. The hybrid device includes various features as described further herein. In and among other features, an embodiment provides efficient system state handling for switching between operating environments.

The illustrated example embodiments will be best understood by reference to the figures. The following description is intended only by way of example, and simply illustrates certain example embodiments.

Figure 1:
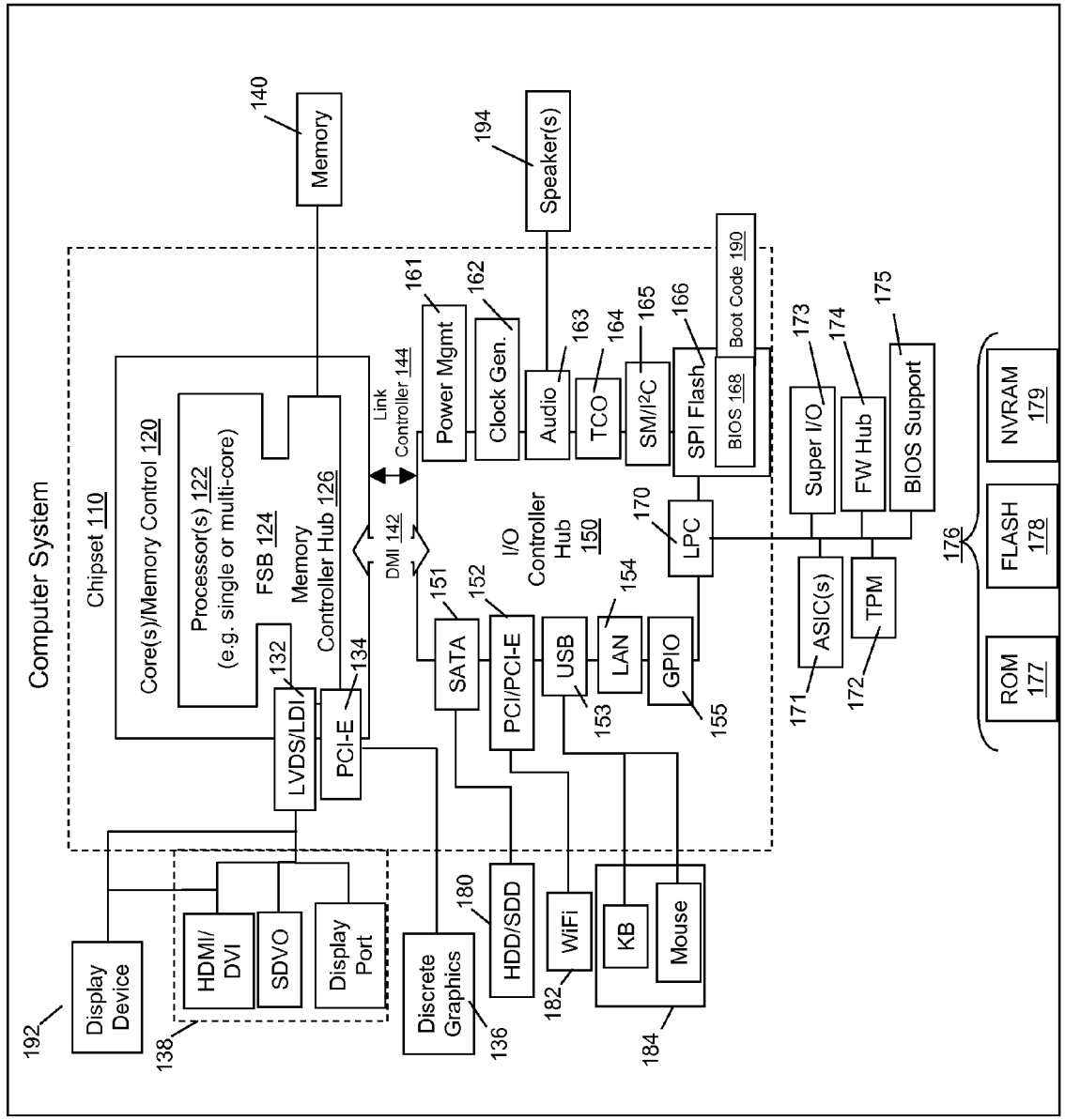
FIG. 1 illustrates example information handling device circuitry.

While various other circuits, circuitry or components may be utilized, FIG. 1 depicts a block diagram of one example of Win-Tel type information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/ DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
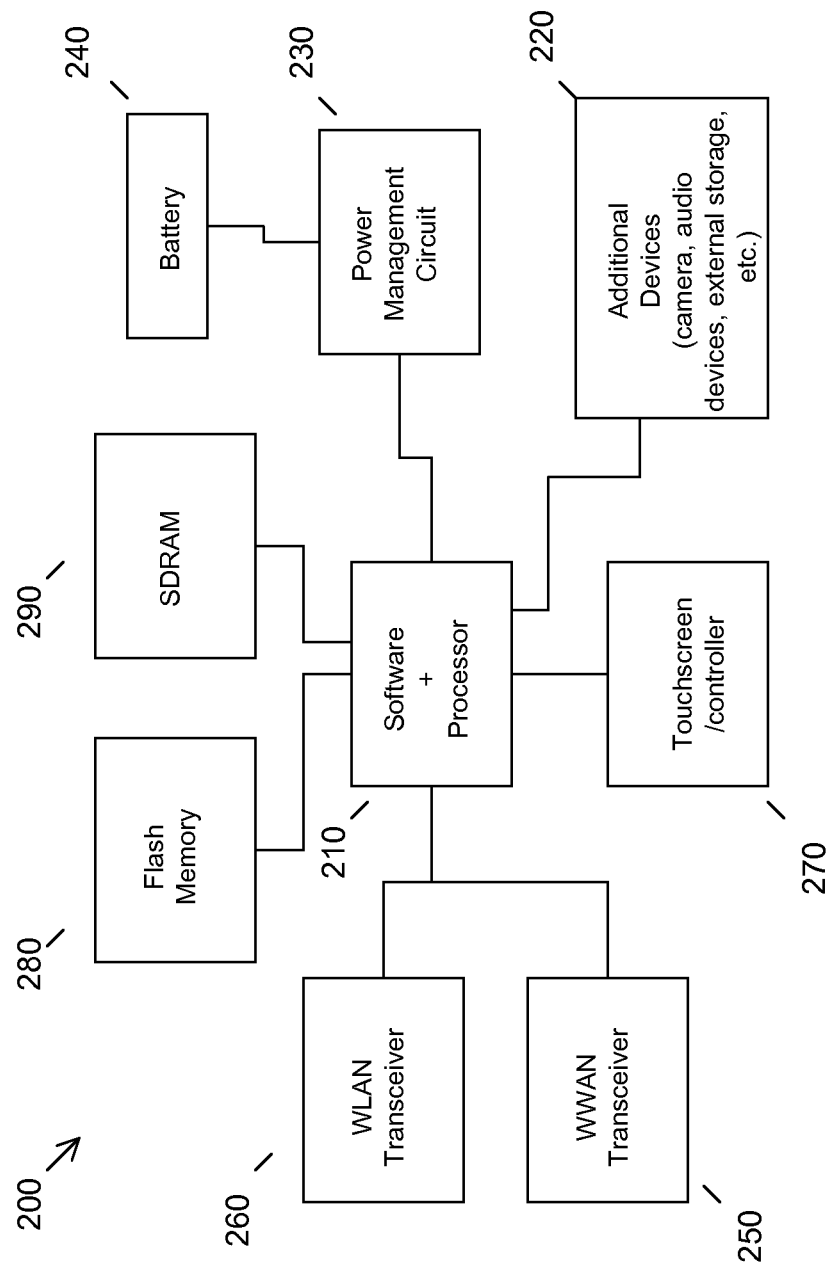
FIG. 2 illustrates example information handling device circuitry.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

As described herein, embodiments combine components of FIG. 1 and FIG. 2 into a hybrid information handling device. While various embodiments may take a variety of hybrid forms, FIG. 3 illustrates one example hybrid environment.

Figure 3:
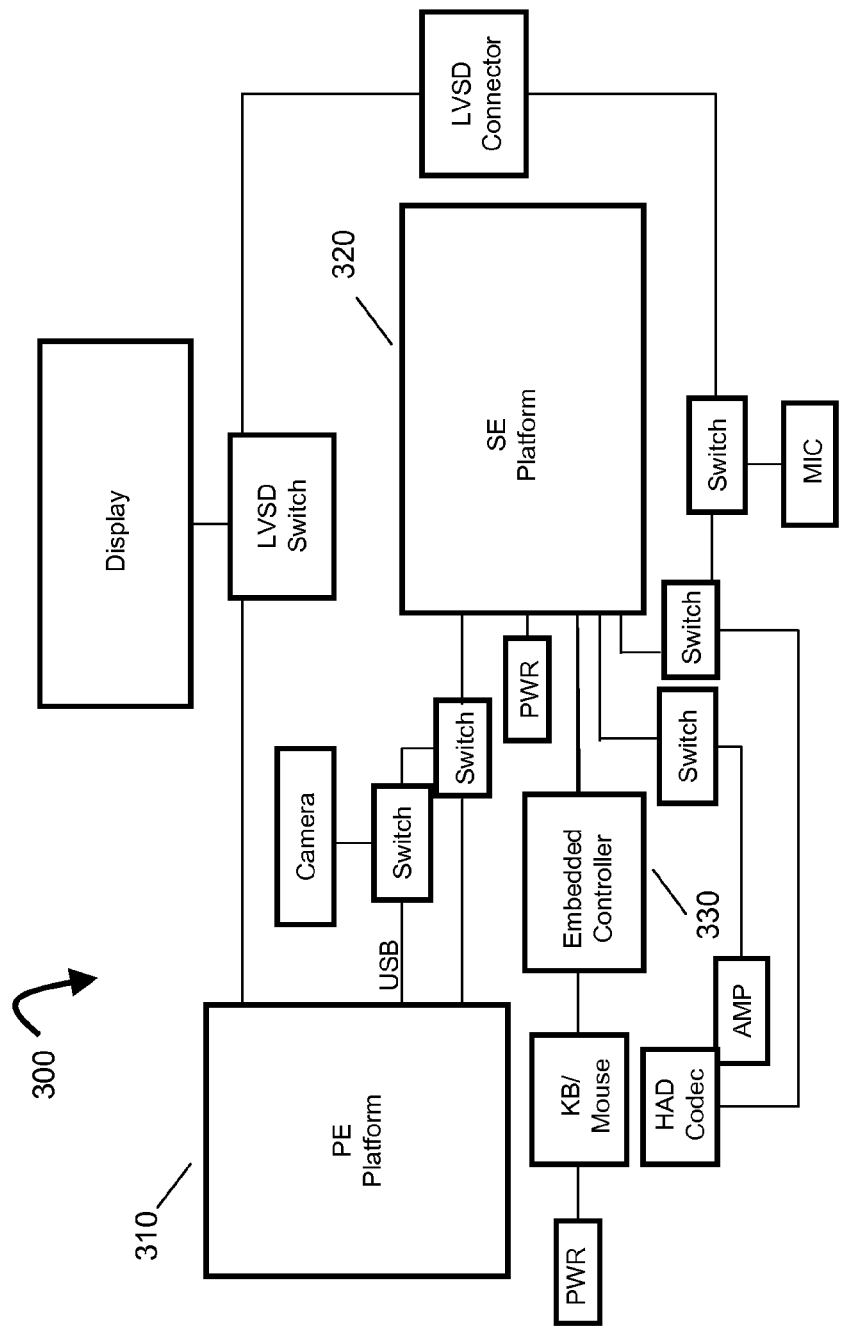
FIG. 3 illustrates an example hybrid information handling device environment.

FIG. 3 provides an illustration of an example embodiment of a hybrid information handling device 300 ("device"). The device 300 has at least two environments: a primary environment (PE) and a secondary environment (SE), supported by two platforms, 310 and 320, respectively. Thus, device 300 may include a PE platform 310 similar to that described in FIG. 1, and a SE platform 320 such as that described in FIG. 2. For example, an embodiment provides a PE in which a user experiences a WINDOWS operating environment, and a SE in which a user experiences an ANDROID operating environment. In PE, the device 300 may thus operate according to a WINDOWS operating system. In SE, the device 300 may operate according to an ANDROID operating system. According to an embodiment, a user may switch between these two environments.

The device 300 may include a display and input interfaces (for example, keyboard, mouse, touch interface, et cetera). Switching electronics (switches in FIG. 3) permit the display, touch interface, camera, microphone and similar peripherals to be used by either the PE or SE platforms 310, 320, depending on which is the actual operating environment chosen by the user. Communications between PE platform 310 and the SE platform 320 may take place at various levels. Control of machine-state, security and other related functions may be provided by an embedded controller 330 of the device 300. Communication links may use protocols like I2C or LPC. Higher bandwidth communications, such as used to move large amounts of data, for example video files, may use methods like USB, PCI express or Ethernet.

When the device 300 is in SE, the device 300 operates as an independent tablet computer. As such, the SE platform 320 and the lightweight/tablet operating system executed therewith, such as an ANDROID operating system, control the operation of the device 300, including the display, peripherals such as a camera, microphone, speaker, shared wireless antenna, accelerometer, SD card, other similar peripheral devices, and software applications.

The device 300 utilizes the PE platform 310 when the user selects such an operational environment, and this operational environment may be set as a default. When in the PE, the device 300 is controlled by a PE platform 310, including for example a WINDOWS operating system. Essentially, the device 300 becomes a conventional laptop computer when PE platform 310 controls operation. As such, the SE platform 320 does not control device 300, peripherals, et cetera, when the device 300 is in the PE state, though an ANDROID operating system of SE platform 320 may be running in the PE, as further described herein.

In such a hybrid environment, there are thus essentially two computing systems within one device 300, that is a primary system (PE), and a secondary system (SE). These systems may share access to various hardware, software, peripheral devices, internal components, et cetera, depending on the environment (PE or SE). Each system is capable of operating independently.

In operating the PE and SE in terms of system power states, one function of embodiments is to ensure adequate coordination between each of PE and SE. Conventionally, if PE and SE were running on separate physical devices, each system would have its own power state management mechanism. With each of PE and SE physically co-located on a device, conventionally a user would be forced to boot into one of PE or SE at a time, without having an ability to coordinate both PE and SE in a managed fashion with regard to power states.

An embodiment thus provides for coordinating system power states of both PE and SE. This coordination may occur for example to facilitate quick transitions between PE and SE. For example, a user may wish to operate the device 301 according to the PE platform 310 until a certain amount of battery is left, then switch to SE operation of the device 310 to perform an activity that uses less power. Thus, an example use case in this space would be a user utilizing PE and a word processing application, such as MICROSOFT WORD, to work on editing a document until the user notices the battery is getting low. Then, the user may switch to SE in order to watch a movie, using lower powered SE to conserve the remaining battery life. Embodiments facilitate such transitioning.

In this description, the Advanced Configuration and Power Interface (ACPI) power states (S0-S5) are used herein to refer to both PE and SE power states simultaneously in a format defined herein where the first numeral in the format indicates power state of PE, and the second numeral indicates power state of SE. Thus, power state S03 indicates PE is in power state S0 (working), whereas SE is in power state S3 (standby/sleep).

In order to facilitate transitioning between PE and SE, an embodiment provides that the SE state may be maintained in S3 while PE operates in S0, and vice versa. Thus, a switch to SE involves placing SE into S0 from S3 (and possibly transitioning PE into a lower power state, for example S3). Triggering events cause the device 300 to transition from SE to PE and from PE to SE control. A variety of triggering events may be utilized, as further described herein. When a triggering event is detected, such as by embedded controller 330, a device component, again such as embedded controller 330, signals to each operating environment platform 310, 320 appropriate information to handle and coordinate power state transitioning.

Table 1 lists some example initial states, final states, triggers for transitioning, and a short note on the example transition. Each of these transitions will be better understood by considering Table 1 in conjunction with FIGS. 4-5, which provide specific, non-limiting examples.

TABLE 1

State Transitions

| Initial State | Final State | Triggers | Notes |
|---|---|---|---|
| S55 | S00 | Power button | Both PE and SE boot from disk |
| S00 | S30 | Switching Application | User launches the Switching Application |
| S00 | S33 | Start –> Sleep Fn-F4 key Inactivity timer Lid switch | EC (embedded controller) sends notification to SE |
| S00 | S45 | Start –> Hibernate Low battery | EC sends notification to SE |
| S00 | S55 | Start –> Shutdown | EC sends notification to SE. |
| S30 | S00 | Switching Application WINDOWS key | User launches the Switching Application |
| S30 | S33 | Inactivity timer Fn-F4 key Lid switch | |
| S30 | S45 | Low battery | System enters S45 via S00 |
| S33 | S00 or S30 | Fn key Power button Lid Switch Fingerprint swipe | Final state (S00 or S30) depends on path into S33 User provides their PE credentials to unlock the system. System enters S30 only after user has been granted access S00. |
| S33 | S45 | Low battery | For low battery event, system enters S45 via S00. |
| S45 | S00 | Power button | EC boots SE |
| S45 | S55 | Battery dead | |
| * | S55 | Power button | Press and hold power button for 5 seconds |

Figure 4:
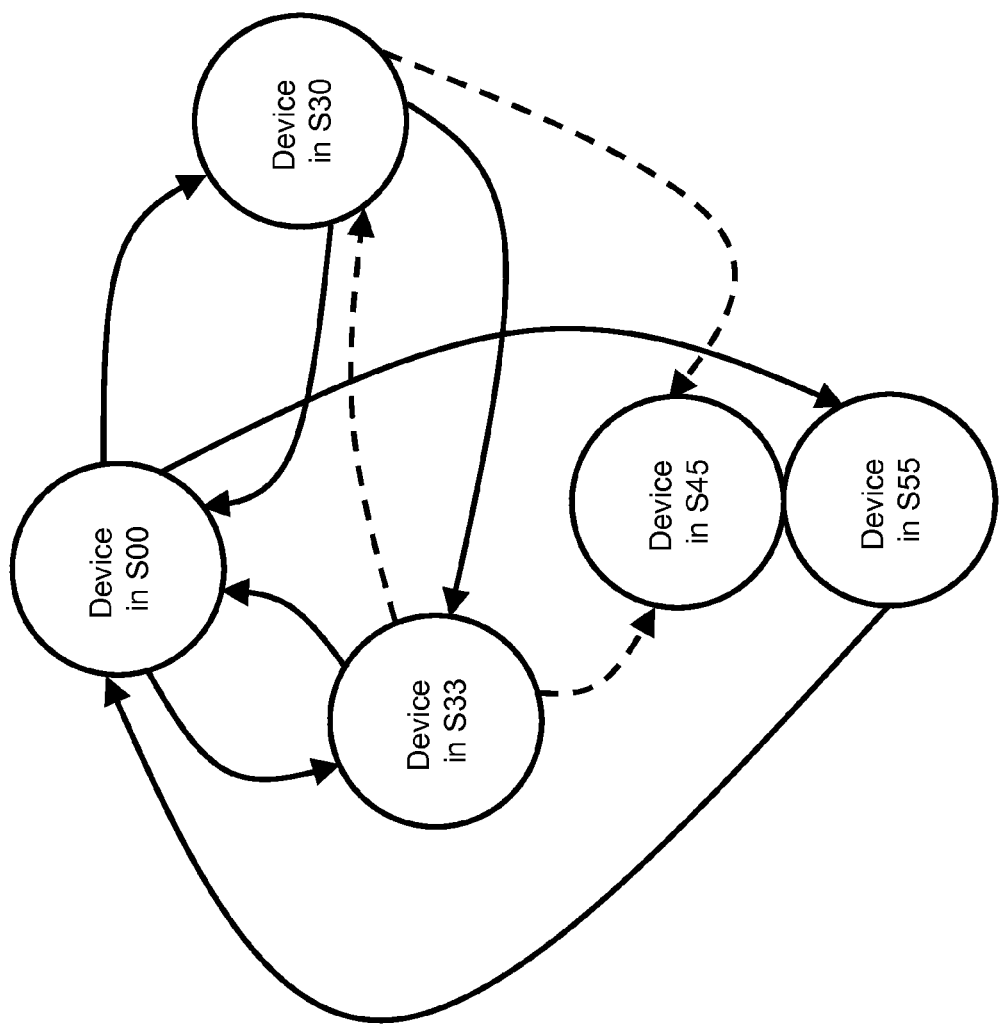
FIG. 4 illustrates an example of hybrid information handling device power states and transitions.

Referring to FIG. 4, when the device 300 is powered on to enter S00 (PE in S0, SE in S0), the following steps may be performed. With the device 300 in a powered off state (for example, state S55, that is, PE in S5, SE in S5), a user presses the power button, and the embedded controller 330 starts the boot sequence for both PE and SE, corresponding to path between S55 and S00 in FIG. 4. The user may see the normal PE boot process (for example, WINDOWS boot process) on the display screen, though SE is also booting to S0.

When the boot processes have been completed, PE and SE each send a message to the embedded controller 330 informing it of their current state (S0 for each), which the embedded controller 330 saves. In this manner, embedded controller 330 acts to coordinate and track each of PE and SE in the various power states as well as the timing of transitioning between power states.

When both PE had SE have completed the boot process (S00), the embedded controller 330 sends to SE a command to enable its USB interface. SE enables USB mass storage and RNDIS (or other communication channels). When PE detects the availability of RNDIS (or other hot plug interface), PE synchronizes system state information (for example, system time, date, and time zone, user language and locale, et cetera) with SE, for example via embedded controller 330. To minimize any impact on PE startup time, SE USB devices, et cetera, may be enabled post PE startup.

Switching procedures (PE to SE and vice versa) may be handled as follows. Initially, the user may interact with a standard PE user interface (for example, standard WINDOWS interface) when system is in S00. That is, if PE is defined as the initial default environment to control on boot up, user will first experience WINDOWS OS environment. SE storage in S00 state is accessible through PE (for example, via WINDOWS EXPLORER as a USB mass storage device). The user launches a PE switching application (for example, as a way to create a trigger event for transitioning), for example from one of WINDOWS start menu or WINDOWS desktop icon. The switching application confirms that SE hardware is available and that the system is currently configured so that SE can run independently.

Then, to switch the device, for example from S00 to S30, corresponding to a switch from PE to SE control, with PE being placed in S3 state, a trigger occurs, for example a user launching the switching application, and the switching application causes the embedded controller 310 to place PE in sleep state S3, while SE remains active, and control is switched to SE. The device 300 thus enters SE and user has the SE operating experience.

To switch the device 300 from S30 to S33 (both PE and SE in sleep state) a triggering event occurs such that embedded controller 330 signals to SE to enter the sleep state. For example, an inactivity timer, a user pressing Fn-F4 keys, a lid switch trip, et cetera may be triggers used by embedded controller to signal SE to enter state S3.

In the event that PE and SE are to be coordinated, such as for PE security credential reuse upon resuming into SE from a sleep or off state, an embodiment may first transition the device 300 to S00 such that primary system may be utilized to set a security related feature. Examples of such transitions are indicated in dashed lines in FIG. 4.

Figure 5:
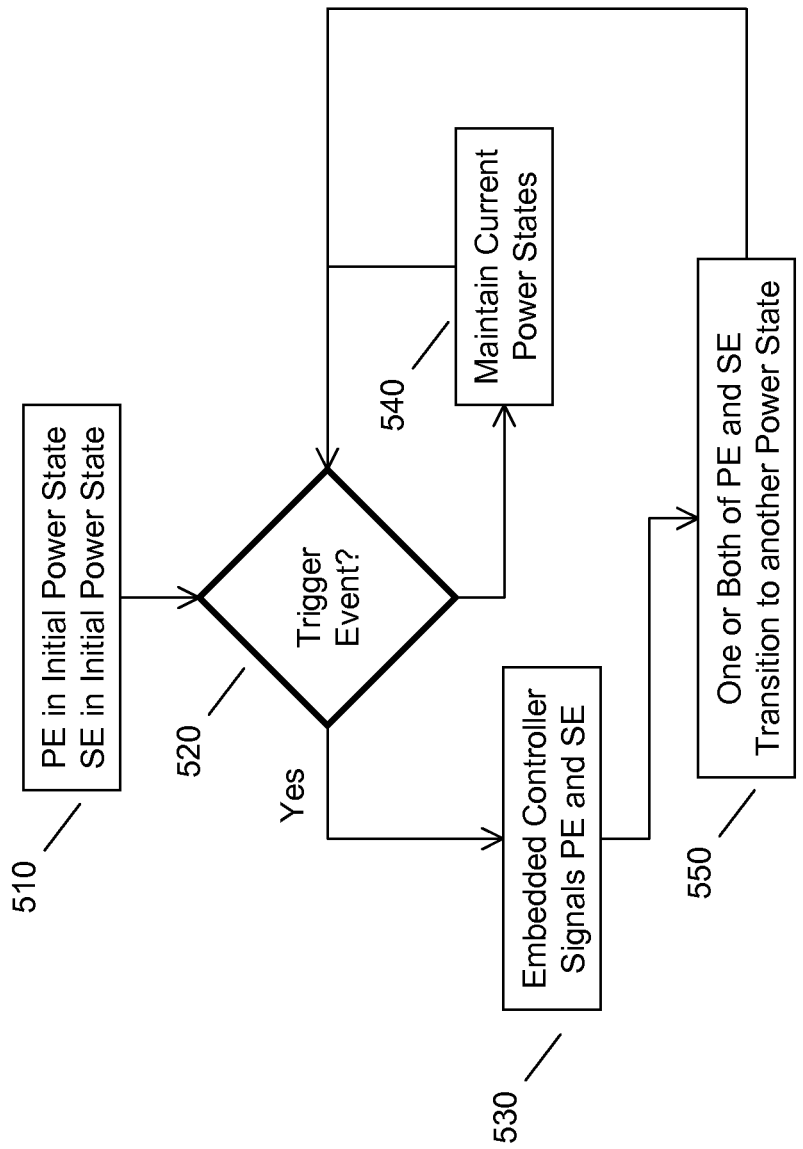
FIG. 5 illustrates an example of power state transitioning in a hybrid information handling device.

Device 300 may switch from any particular power state combination to any other particular power state combination in similar fashion as described for transitioning between the example power states described heretofore. Referring to FIG. 5, for example, device 300 initially places PE and SE into an initial power state (such as S00 on start up) 510. Device 300 then detects an appropriate triggering 520 event and transitions power states for PE and/or SE via embedded controller signaling 530. Embedded controller may wait for a subsequent triggering event to transition power states again, or maintain current power states if no trigger event occurs 540. As described herein, Table 1 lists some non-limiting examples of such power state transitioning.

Embodiments may be implemented in one or more information handling devices configured appropriately to execute program instructions consistent with the functionality of the embodiments as described herein. In this regard, FIGS. 1-3 illustrate non-limiting examples of such devices and components thereof. While mobile information handling devices such as tablet computers, laptop computers, and smartphones have been specifically mentioned as examples herein, embodiments may be implemented using other systems or devices as appropriate.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium (s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
   one or more processors;
   a memory that stores instructions executable by the one or more processors to:
   provide a primary user operating system environment and a secondary user operating system environment;
   wherein the primary user operating system environment and the secondary user operating system environment are supported by separate hardware platforms, wherein each of the separate hardware platforms comprise a processor and memory;
   ascertain a trigger event for switching between said primary user operating system environment and said secondary user operating system environment;
   provide a power state transitioning signal responsive to said trigger event, wherein the power state transitioning signal comprises information for transitioning a power state of one or more of said primary user operating system environment and said secondary user operating system environment; and
   place one of said primary user operating system environment and said secondary user operating system environment in a working state while one of said primary user operating system environment and said secondary user operating system environment is in a sleeping state.

2. The information handling device of claim 1, further comprising an embedded controller that signals one or more of said primary user operating system environment and said secondary user operating system environment responsive to said trigger event;
   wherein to signal further comprises signaling with said embedded controller to transition a power state of one or more of said primary user operating system environment and said secondary user operating system environment.

3. The information handling device of claim 2, wherein responsive to said signaling, one of said primary user operating system environment and said secondary user operating system environment is placed in a working state, and the other of said primary user operating system environment and said secondary user operating system environment is placed in a sleeping state.

4. The information handling device of claim 1, wherein said information handling device maintains said primary user operating system environment in a working state and maintains said secondary user operating system environment in a working state.

5. The information handling device of claim 1, wherein said information handling device maintains said primary user operating system environment in a working state and maintains said secondary user operating system environment in a sleeping state.

6. The information handling device of claim 1, wherein said information handling device maintains said primary user operating system environment in a sleeping state and maintains said secondary user operating system environment in a working state.

7. The information handling device of claim 1, wherein said information handling device maintains both said primary user operating system environment and said secondary user operating system environment in a sleeping state.

8. The information handling device of claim 1, wherein said primary user operating system environment is implemented on a primary environment platform.

9. The information handling device of claim 1, wherein said secondary user operating system environment is implemented on a secondary environment platform.

10. The information handling device of claim 9, wherein the secondary environment platform comprises a system on chip architecture.

11. A method comprising:
    providing a primary user operating system environment and a secondary user operating system environment in an information handling device;
    wherein the primary user operating system environment and the secondary user operating system environment are supported by separate hardware platforms, wherein each of the separate hardware platforms comprise a processor and memory;
    ascertaining a trigger event for switching between said primary user operating system environment and said secondary user operating system environment;
    providing a power state transitioning signal responsive to said trigger event, wherein the power state transitioning signal comprises information for transitioning a power state of one or more of said primary user operating system environment and said secondary user operating system environment; and
    placing one of said primary user operating system environment and said secondary user operating system environment in a working state while one of said primary user operating system environment and said secondary user operating system environment is in a sleeping state.

12. The method of claim 11, further comprising signaling to, with an embedded controller, one or more of said primary user operating system environment and said secondary user operating system environment responsive to said trigger event;
    wherein to signal further comprises signaling with said embedded controller to transition a power state of one or more of said primary user operating system environment and said secondary user operating system environment.

13. The method of claim 12, further comprising, responsive to said signaling, placing one of said primary user operating system environment and said secondary user operating system environment in a working state, and placing the other of said primary user operating system environment and said secondary user operating system environment in a sleeping state.

14. The method of claim 11, further comprising, responsive to said trigger event, maintaining both said primary user operating system environment and said secondary user operating system environment in a working state.

15. The method of claim 11, further comprising, responsive to said trigger event, maintaining said primary user operating system environment in a working state and maintaining said secondary user operating system environment in a sleeping state.

16. The method according to claim 11, further comprising, responsive to said trigger event, maintaining said primary user operating system environment in a sleeping state and maintaining said secondary user operating system environment in a working state.

17. The method of claim 11, wherein said primary user operating system environment is implemented on a primary environment platform.

18. The method of claim 11, wherein said secondary user operating system environment is implemented on a secondary environment platform.

19. The method of claim 18, wherein the secondary environment platform comprises a system on chip architecture.

20. A computer program product comprising:
- a storage device having computer readable program code embodied therewith, the computer readable program code being executable by a processor and comprising:
    - program code that provides a primary user operating system environment and a secondary user operating system environment in an information handling device;
    - wherein the primary user operating system environment and the secondary user operating system environment are supported by separate hardware platforms, wherein each of the separate hardware platforms comprise a processor and memory;
    - program code that ascertains a trigger event for switching between said primary user operating system environment and said secondary user operating system environment;
    - program code that provides a power state transitioning signal responsive to said trigger event, wherein the power state transitioning signal comprises information for transitioning a power state of one or more of said primary user operating system environment and said secondary user operating system environment; and
    - program code that places one of said primary user operating system environment and said secondary user operating system environment in a working state while one of said primary user operating system environment and said secondary user operating system environment is in a sleeping state.

* * * * *